T. C. HUGHES.
VEHICLE WHEEL.
APPLICATION FILED JAN. 17, 1920.
1,404,960.
Patented Jan. 31, 1922.
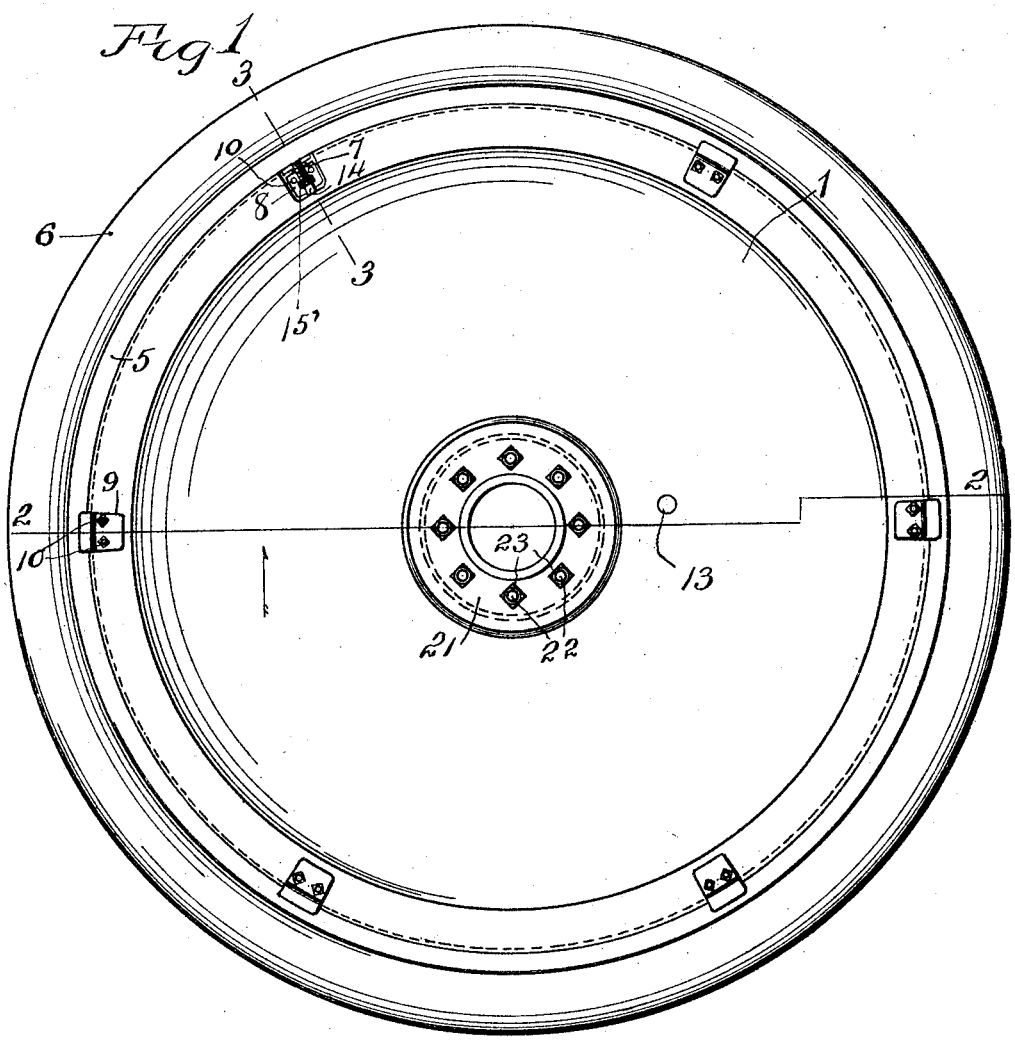
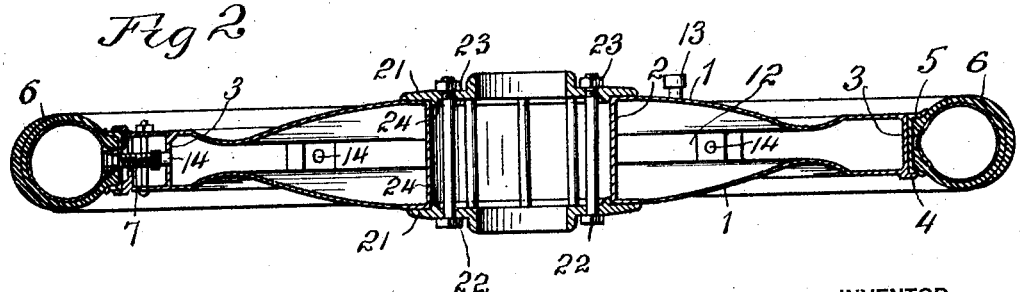
Witness:
R. E. Hamilton
INVENTOR
Tyre C. Hughes,
BY
Warren D. House,
His ATTORNEY

T. C. HUGHES.
VEHICLE WHEEL.
APPLICATION FILED JAN. 17, 1920.

1,404,960.

Patented Jan. 31, 1922.

Witness:
R.E. Hamilton

INVENTOR
Tyre C. Hughes
BY
Warren D. House,
His ATTORNEY

UNITED STATES PATENT OFFICE.

TYRE C. HUGHES, OF TULSA, OKLAHOMA.

VEHICLE WHEEL.

1,404,960.     Specification of Letters Patent.     Patented Jan. 31, 1922.

Application filed January 17, 1920. Serial No. 352,225.

*To all whom it may concern:*

Be it known that I, TYRE C. HUGHES, a citizen of the United States, residing at Tulsa, in the county of Tulsa and State of Oklahoma, have invented a certain new and useful Improvement in Vehicle Wheels, of which the following is a specification.

My invention relates to improvements in vehicle wheels.

It relates particularly to vehicle wheels provided with inflatable tires.

The object of my invention is to provide in a vehicle wheel of the kind described a compressed air storage chamber connected by one or more ducts with the inflatable tire, thereby increasing the resiliency of the tire and reducing the liability of the tire to heat under a heavy load.

My invention provides further an air storage chamber having walls which are good heat conductors and which are exposed to the atmosphere, whereby the storage chamber will serve to radiate heat to the atmosphere, thus cooling the air in the chamber and tire.

A further object of my invention is to provide a construction, which is simple, cheap to manufacture, durable and not liable to get out of order and with which a tire of relatively small diameter may carry a heavy load without liability of heating, and which will be possessed of relatively great resiliency and which in case of leakage will not become deflated as quickly as the ordinary inflatable tire of like size.

My invention provides still further a novel wheel construction which may be advantageously employed with the ordinary rims and inflatable tires now in use.

The novel features of my invention are hereinafter fully described and claimed.

In the accompanying drawings, which illustrate the preferred embodiment of my invention, Fig. 1 is a side elevation of my improved vehicle wheel, one of the closure lugs being removed.

Fig. 2 is a horizontal sectional view on the line 2—2 of Fig. 1.

Similar reference characters designate similar parts in the different views.

Figure 3:
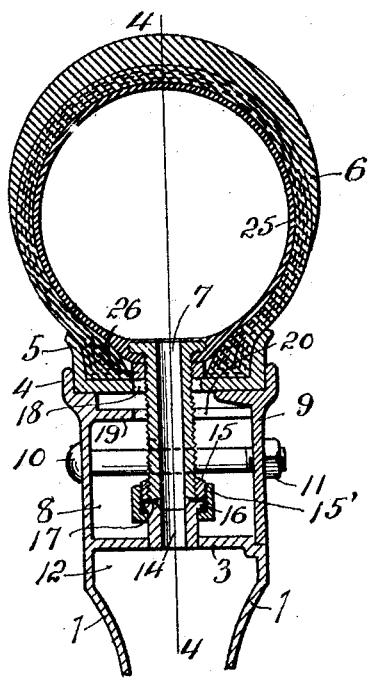
Fig. 3 is an enlarged cross section on the line 3—3 of Fig. 1.

My improved vehicle wheel is preferably provided with a sheet metal hollow body comprising two side walls 1, a central circular wall 2 and a peripheral wall 3, the latter being provided at one edge with an annular flange 4, which with the wall 3 serves as a seat for an ordinary rim 5, which is slipped sidewise in the usual manner on the body of the wheel, and which is adapted to support in the usual manner an ordinary inflatable tire 6, which is provided with one or more of the usual externally threaded filling tubes 7, which respectively extend into peripheral chambers 8 provided in the body of the wheel, each of the chambers 8 having an open side at the side of the wheel opposite to the side having the annular flange 4.

The chambers 8 are respectively normally releasably closed by closure lugs 9, which engage one side of the rim 5, thereby releasably holding the latter in its operative position. The closure lugs 9 are releasably clamped in the closed position by bolts 10 which extend transversely through the body of the wheel and the closure lugs 9 and are provided with removable nuts 11.

The walls 1, 2 and 3 form an air-tight storage chamber 12, which may be filled with compressed air through an ordinary filling tube 13 with which one of the sides 1 is provided.

Figure 4:
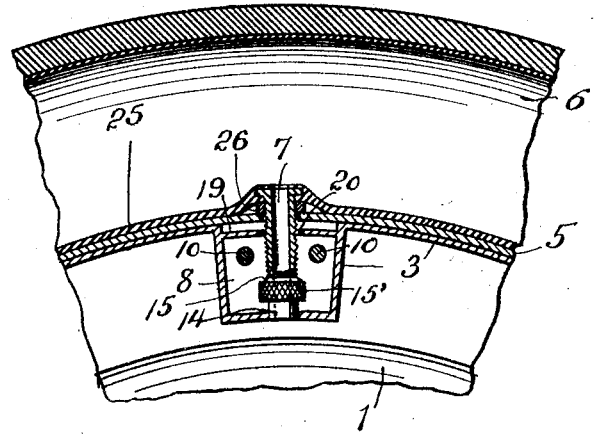
Fig. 4 is a vertical sectional view on the line 4—4 of Fig. 3.

Respectively mounted in the inner walls of the chambers 8, Figs. 3 and 4, are radial tubes 14, which respectively extend into the chambers 8 and have respectively releasably seated in their outer ends the inner ends of the filling tubes 7.

On each of the filling tubes 7 is fitted an internally and externally threaded sleeve 15, Fig. 3, which is adapted to be releasably fitted in an internally threaded stuffing box collar 15', which engages an annular flange 16 at the outer end of the adjacent tube 14. A gasket 17 is mounted between the tube 14 and the sleeve 15.

The rim 5 is provided with radial holes 18 adapted to receive respectively therethrough the filling tubes 7 and the sleeves 15 mounted thereon.

The outer wall 19 of each chamber 8 is provided with a transverse slot 20 which extends to the open side of the chamber 8, and which permits a rim with the tire mounted thereon to be slipped laterally into its seat.

Clamped respectively to the outer sides of the walls 1 are two hub rings 21, which are clamped to said walls by transverse bolts 22 located within the circular wall 2 and provided with nuts 23.

Each hub ring 21 is provided on its inner side with an annular flange 24, Fig. 2, which is fitted within the circular wall 2, thereby fixing the rings 21 in their proper positions.

In mounting the rim and tire on the wheel, the closure lugs 9 are removed, and the tire, deflated, is placed in the rim 5, after which the rim is slipped laterally into its seat against the annular flange 4. The inner ends of the filling tubes 7 are then respectively seated in the outer ends of the tubes 14, which form ducts for the passage of air between the chamber 12 and the tire 6. The packing collars 15' are then engaged with the threaded sleeves 15 respectively, so as to make air tight unions between the tubes 14 and 7.

The lugs 9 are then secured in their operative positions by means of the bolts 10 and nuts 11, thereby closing the chambers 8 and holding the rim 5 in its seat.

The chamber 12 may then be filled with compressed air in the usual manner through the filling tube 13. There are no valves between the tire 6 and chamber 12, so that the compressed air will fill the tire 6 through the tubes 14 and 7, and the air has a free passage from the tire 6 to the storage chamber 12. This construction assures a large quantity of air under pressure in direct communication with the air in the inflated tire, thereby affording great resiliency to the latter and permitting the dissipation of heat by conduction through the compressed air in the tire and chamber 12. The walls of the latter being, preferably, good conductors of heat, the air in the chamber 12 will be cooled by conduction of heat through the walls 1 to the atmosphere.

As there are no spokes in the wheel, it is not liable to be clogged with mud, and less power will be required to propel the wheel through mud than with a spoked wheel of like size.

Owing to the great resiliency of the tire afforded by its connection with the storage chamber and to the elimination of heat by conduction and radiation, a tire of relatively small diameter may be employed for carrying heavy loads, thereby reducing the original cost and upkeep of a machine provided with my improvement.

While I have illustrated a wheel provided with a plurality of connections with the tire 6, it will be obvious that the wheel may be provided with but a single connecting tube 14, which construction would permit an ordinary inflatable tire and rim to be used without any modification. In such case, the same closure lugs 9 would be employed, but only the chamber 8 into which the filling tube of the tire extended would be provided with the connecting tube 14.

In the drawing, I have shown an inflatable tire having the usual inner tube 25, to which the filling tubes 7 are clamped by means of nuts 26 in the usual manner. Tires, however, of the ordinary type not provided with inner tubes may be used in connection with my improvement.

I do not limit my invention to the structure shown and described, as many modifications, within the scope of the appended claims, may be made without departing from the spirit of my invention.

What I claim is:

1. A vehicle wheel having a body comprising a hub and spaced apart side members which form a storage chamber for compressed air, said chamber having means adapted for air tight connection with the filling tube of an inflatable tire, the body having means for supporting an inflatable tire.

2. A vehicle wheel having a body comprising a hub and spaced apart side members which form a storage chamber for compressed air, the storage chamber having walls exposed to the atmosphere and composed of material which readily conducts heat, said chamber having always open means adapted for air tight connection with the filling tube of an inflatable tire, the body having means for supporting an inflatable tire.

3. A vehicle wheel comprising a hub and spaced apart side members which form a hollow air tight body adapted to contain compressed air and having means for the introduction of air therein under pressure, the body having means adapted for air tight connection with the filling tube of an inflatable tire, and having means for supporting an inflatable tire.

4. A vehicle wheel comprising a hub and spaced apart side members which form a hollow sheet metal air tight body adapted to contain compressed air and having always open means adapted for air tight connection with the filling tube of an inflatable tire, and having means for supporting an inflatable tire.

5. A vehicle wheel having a body comprising a hub and spaced apart side members which form a storage chamber for compressed air, an inflatable tire mounted on said body and having a filling tube, and means connecting said filling tube with said storage chamber.

6. A vehicle wheel having a hollow body adapted to hold air under pressure, the body having a seat adapted to support a rim, the body near its periphery having a chamber open at one side adapted to receive the filling tube of an inflatable tire mounted on the rim, means accessible through the open side of said chamber adapted to connect the filling tube with said body, a closure for said open side of said chamber adapted to engage and retain the rim in its seat, and releasable means for retaining said closure in its operative position.

7. A vehicle wheel having a body comprising a hub and spaced apart side members which form a storage chamber for compressed air, said chamber having one or more air ducts, a rim mounted on said body, and an inflatable tire mounted on said rim and having one or more filling tubes respectively connected with said ducts.

8. A vehicle wheel having a hollow body adapted to hold air under pressure and provided with one or more air ducts and one or more chambers, each chamber having an open side, one or more closures for said open sides of said chambers respectively, a rim mounted on said body and retained in position by said closures, an inflatable tire mounted on said rim and provided with one or more filling tubes extending respectively into said chambers and respectively connecting with said ducts.

9. A vehicle wheel having a hollow body adapted to hold air under pressure and provided with a rim seat and one or more air ducts and one or more chambers, each chamber having an open side, said ducts extending respectively into said chambers and having means for connection respectively with filling tubes of an inflatable tire carried by a rim mounted in said seat, and one or more removable closures for the open sides of said chambers respectively adapted to engage and hold the rim in said seat.

10. A vehicle wheel having a body provided with a storage chamber for air under pressure and having a chamber having an open side, the body having a rim seat, an air duct leading from the storage chamber to the other chamber and having always open means adapted for releasable connection with and in constant communication with the filling tube of an inflatable tire, and a releasable closure for the open side of the second named chamber adapted to engage and hold in said seat a rim carrying said tire.

11. A vehicle wheel having a body provided with a storage chamber for air under pressure and having a chamber having an open side, the body having a rim seat, an air duct leading from the storage chamber to the other chamber, a rim mounted in said seat, a closure for said open side releasably attached to the body and releasably engaging said rim to hold the latter in said seat, and an inflatable tire mounted on said rim and having a filling tube extending into the second named chamber and releasably engaging said duct.

In testimony whereof I have signed my name to this specification.

TYRE C. HUGHES.